(12) United States Patent
Makino et al.

(10) Patent No.: US 10,918,988 B2
(45) Date of Patent: Feb. 16, 2021

(54) HONEYCOMB FILTER

(71) Applicant: NGK Insulators, Ltd., Nagoya (JP)

(72) Inventors: Tetsuya Makino, Nagoya (JP); Makoto Teranishi, Nagoya (JP); Tadato Ito, Nagoya (JP); Etsuji Ohara, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/568,724

(22) Filed: Sep. 12, 2019

(65) Prior Publication Data

US 2020/0101410 A1  Apr. 2, 2020

(30) Foreign Application Priority Data

Sep. 27, 2018 (JP) .............................. JP2018-181616

(51) Int. Cl.
*B01D 46/24* (2006.01)
(52) U.S. Cl.
CPC ....... *B01D 46/2474* (2013.01); *B01D 46/247* (2013.01); *B01D 46/2429* (2013.01); *B01D 2046/2433* (2013.01); *B01D 2046/2492* (2013.01)
(58) Field of Classification Search
CPC ............ B01D 46/2429; B01D 46/2474; B01D 46/247; B01D 2046/2496; B01D 2046/2433
USPC ............ 422/168, 177, 180; 55/523; 428/118
See application file for complete search history.

(56) References Cited

U.S. PATENT DOCUMENTS

| | | | |
|---|---|---|---|
| 4,417,908 A | 11/1983 | Pitcher, Jr. | |
| 2004/0206044 A1* | 10/2004 | Kondo | B01D 46/2455 52/782.1 |
| 2004/0258582 A1 | 12/2004 | Miwa et al. | |
| 2007/0180804 A1 | 8/2007 | Mizutani | |
| 2007/0240396 A1 | 10/2007 | Mizutani | |
| 2010/0247852 A1* | 9/2010 | Yamada | B01D 46/247 428/116 |
| 2011/0030357 A1* | 2/2011 | Vincent | F01N 3/0222 60/311 |
| 2014/0298779 A1 | 10/2014 | Miyairi | |

FOREIGN PATENT DOCUMENTS

| | | |
|---|---|---|
| JP | S58-196820 A1 | 11/1983 |
| JP | 2007-209842 A1 | 8/2007 |
| JP | 4279497 B2 | 6/2009 |

(Continued)

*Primary Examiner* — Tom P Duong
(74) *Attorney, Agent, or Firm* — Burr & Brown, PLLC

(57) ABSTRACT

A honeycomb filter includes a pillar-shaped honeycomb substrate and a plugging portion provided at an end portion on either an inflow or outflow end face side of cells, wherein, in a section orthogonal to the cell extending direction, the shapes of an inflow cell having the plugging portion and an outflow cell having the plugging portion are hexagonal. In the plurality of cells, a plurality of inflow cells surround one outflow cell such that one side of the inflow cell and one side of the outflow cell adjacent to the inflow cell are parallel. The partition wall includes a first partition wall and a second partition wall, at least one of the first partition walls is configured such that a ratio of a thickness of the second partition wall to the first partition wall is 1.0 to 2.5, and a total open frontal area is 35% to 95%.

12 Claims, 5 Drawing Sheets

(56) References Cited

FOREIGN PATENT DOCUMENTS

| | | | |
|---|---|---|---|
| JP | 4282960 | B2 | 6/2009 |
| JP | 4567674 | B2 | 10/2010 |
| JP | 2012-081415 | A1 | 4/2012 |
| JP | 2014-200741 | A1 | 10/2014 |

\* cited by examiner

HONEYCOMB FILTER

The present application is an application based on JP 2018-181616 filed on Sep. 27, 2018 with Japan Patent Office, the entire contents of which are incorporated herein by reference.

BACKGROUND OF THE INVENTION

Field of the Invention

The present invention relates to a honeycomb filter, and more particularly, to a honeycomb filter capable of achieving a low pressure loss when in use.

Description of the Related Art

In various industries, internal-combustion engines are used as power sources. On the other hand, the exhaust gas emitted when an internal-combustion engine burns a fuel contains poisonous gases, such as nitrogen oxides, and particulate matters, such as soot or ash. Hereinafter, the particulate matters may be referred to as "PM." The "PM" stands for particulate matters. In recent years, the regulations on the removal of PM discharged from diesel engines are becoming increasingly strict worldwide, and as the filters for removing PM, a wall flow type filter having a honeycomb structure, for example, is used.

As the wall flow type filters, there have been proposed various types of honeycomb filters provided with honeycomb substrates having porous partition walls that define a plurality of cells forming fluid through channels, and plugging portions provided at the open ends on one side of the plurality of cells (e.g. refer to Patent Documents 1 to 7). In such a honeycomb filter, inflow cells having the plugging portions thereof provided on the outflow end face side and outflow cells having the plugging portions thereof provided on the inflow end face side are, for example, alternately arranged by being separated by the partition walls, and the porous partition walls form the filtering bodies that remove PM.

[Patent Document 1] JP-A-2007-209842
[Patent Document 2] JP-A-2012-081415
[Patent Document 3] JP-4279497
[Patent Document 4] JP-4567674
[Patent Document 5] JP-A-2014-200741
[Patent Document 6] JP-4282960
[Patent Document 7] JP-A-58-196820

SUMMARY OF THE INVENTION

In the conventional honeycomb filters described in Patent Documents 1 to 7, there has been a tendency in that the permeation resistance of "the partition walls provided between the inflow cells" is higher than that of "the partition walls provided between inflow cells and outflow cells", thus making it difficult for exhaust gas to flow. For this reason, the conventional honeycomb filters have been posing a problem of uneven flow of exhaust gas in the honeycomb filters, leading to an increase in the pressure loss of the honeycomb filters.

The present invention has been made in view of the problem with the prior arts described above. The present invention provides a honeycomb filter capable of achieving a low pressure loss when in use. In particular, the present invention provides a honeycomb filter capable of suppressing an increase in pressure loss attributable to the accumulation of PM on the surfaces of partition walls, thereby achieving a lower pressure loss.

According to the present invention, a honeycomb filter described below is provided.

According to a first aspect of the present invention, a honeycomb filter is provided including:
a pillar-shaped honeycomb substrate having a porous partition wall provided, surrounding a plurality of cells that extend from an inflow end face to an outflow end face; and
a plugging portion provided at an end portion on either the inflow end face side or the outflow end face side of the cells,
wherein, in a section that is orthogonal to the extending direction of the cells,
the shape of an inflow cell having the plugging portion provided at the end portion on the outflow end face side is hexagonal,
the shape of an outflow cell having the plugging portion provided at the end portion on the inflow end face side is hexagonal,
the plurality of cells have a structure in which a plurality of inflow cells surround the periphery of one outflow cell such that one side of the inflow cell and one side of the outflow cell that is adjacent to the inflow cell are parallel,
the partition wall includes a first partition wall provided between the inflow cell and the outflow cell and a second partition wall provided between the inflow cells,
at least one of the first partition walls is configured such that a value of the ratio of a thickness T2 of the second partition wall with respect to a thickness T1 of the first partition wall (T2/T1) is greater than 1.0 and below 2.5, and
a total open frontal area of the honeycomb substrate is greater than 35% and equal to or less than 95%.

According to a second aspect of the present invention, the honeycomb filter according to the first aspect is provided, wherein the second partition wall has a thickness inclination section in which the thickness T2 of the second partition wall decreases or increases toward a portion of connection with the first partition wall.

According to a third aspect of the present invention, the honeycomb filter according to the first or second aspects is provided, wherein the thickness T1 of the first partition wall is 70 to 350 µm.

According to a fourth aspect of the present invention, the honeycomb filter according to any one of the first to third aspects is provided, wherein the hydraulic diameter of the inflow cell is greater than the hydraulic diameter of the outflow cell.

According to a fifth aspect of the present invention, the honeycomb filter according to any one of the first to fourth aspects is provided, wherein the length of one side of the outflow cell is 0.5 to 1.6 mm.

According to a sixth aspect of the present invention, the honeycomb filter according to any one of the first to fifth aspects is provided, wherein the porosity of the partition wall is 35 to 70%.

According to seventh aspect of the present invention, the honeycomb filter according to the sixth aspect is provided, wherein the porosity of the partition wall is 50 to 70%.

According to an eighth aspect of the present invention, the honeycomb filter according to any one of the first to seventh aspects is provided, wherein in a section that is orthogonal to the extending direction of the cells, six hexagonal inflow cells surround the periphery of one outflow cell.

According to a ninth aspect of the present invention, the honeycomb filter according to any one of the first to eighth aspects is provided, wherein the inflow cells have a regular hexagonal shape in a section that is orthogonal to the extending direction of the cells.

According to a tenth aspect of the present invention, the honeycomb filter according to any one of the first to eighth aspects is provided, wherein the inflow cells have a hexagonal shape other than a regular hexagonal shape in a section that is orthogonal to the extending direction of the cells.

According to an eleventh aspect of the present invention, the honeycomb filter according to the tenth aspect is provided, wherein the inflow cells have a hexagonal shape in which the lengths of at least one set of opposing sides are different in a section that is orthogonal to the extending direction of the cells.

According to a twelfth aspect of the present invention, the honeycomb filter according to the eleventh aspect is provided, wherein the inflow cells have a hexagonal shape in which opposing sides have different lengths in a section that is orthogonal to the extending direction of the cells.

The honeycomb filter in accordance with the present invention is configured such that, when the thickness of the first partition wall provided between the inflow cell and the outflow cell is denoted by T1 and the thickness of the second partition wall provided between the inflow cells is denoted by T2, the value of T2/T1 is greater than 1.0 and below 2.5. Further, in the honeycomb filter in accordance with the present invention, the total open frontal area of the honeycomb substrate is greater than 35% and equal to or less than 95%. The honeycomb filter in accordance with the present invention has the advantage that makes it possible to achieve a lower pressure loss when used as a filter that traps the PM in exhaust gas, as compared with conventional honeycomb filters. In particular, the honeycomb filter in accordance with the present invention exhibits a marked advantage that makes it possible to effectively suppress an increase in pressure loss attributable to the accumulation of PM on the surfaces of the partition walls, thereby achieving a lower pressure loss.

The honeycomb filter in accordance with the present invention has a relatively larger thickness T2 of the second partition walls to relatively increase the total volume of the pores of the second partition walls, thus achieving smoother flow of exhaust gas through the pores of the second partition walls. Thus, even if PM, such as soot, accumulates on the surfaces of the first partition walls with a resultant increase in the permeation resistance of the first partition walls, the exhaust gas running into the inflow cells smoothly passes into the outflow cells through the pores of the second partition walls. This can achieve a low pressure loss of the honeycomb filter. In particular, the first partition walls provide the mainstream of exhaust gas that flows from the inflow cells to the outflow cells, and therefore tend to easily accumulate PM, such as soot, thus easily leading to an increase in the permeation resistance as PM accumulates. In the honeycomb filter in accordance with the present invention, if the permeation resistance of the first partition walls increases, then the second partition walls can be used extremely effectively as the through channels of exhaust gas.

Further, as compared with the first partition walls, the second partition walls contribute less to an increase in pressure loss in an initial state of use. Hence, even when the thickness T2 of the second partition walls is relatively increased by a certain amount, an excessive increase in pressure loss of the honeycomb filter in the initial state of use can be suppressed by setting the total open frontal area of the honeycomb substrate to the foregoing value range.

DETAILED DESCRIPTION OF THE PRESENT INVENTION

The following will describe the embodiments of the present invention. However, the present invention is not limited to the following embodiments. Hence, it should be understood that alterations, improvements and the like can be added to the following embodiments, as appropriate, on the basis of the ordinary knowledge of a person skilled in the art without departing from the spirit of the present invention.

Figure 1:
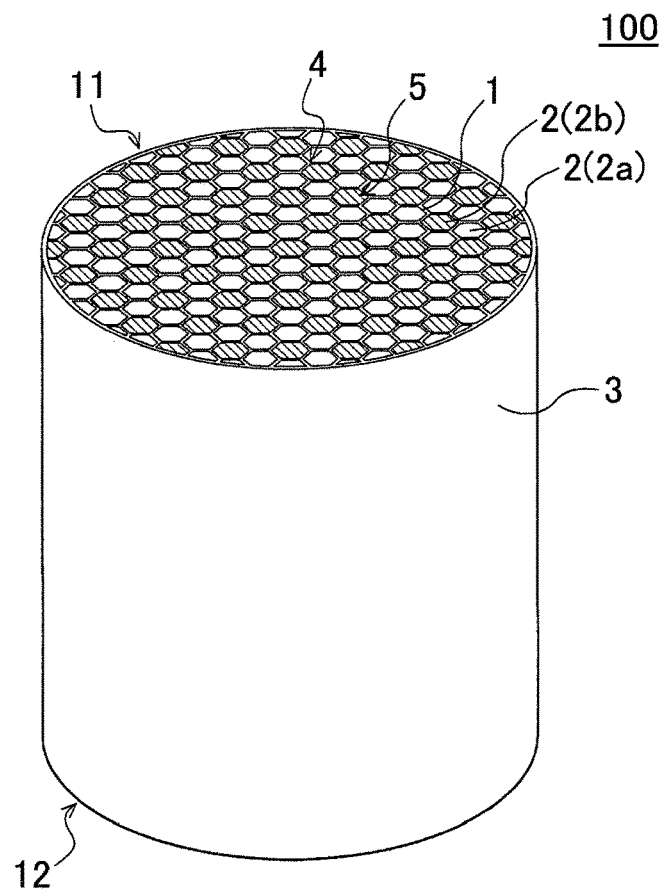
FIG. 1 is a perspective view schematically showing an embodiment of the honeycomb filter in accordance with the present invention observed from an inflow end face side.
Figure 2:
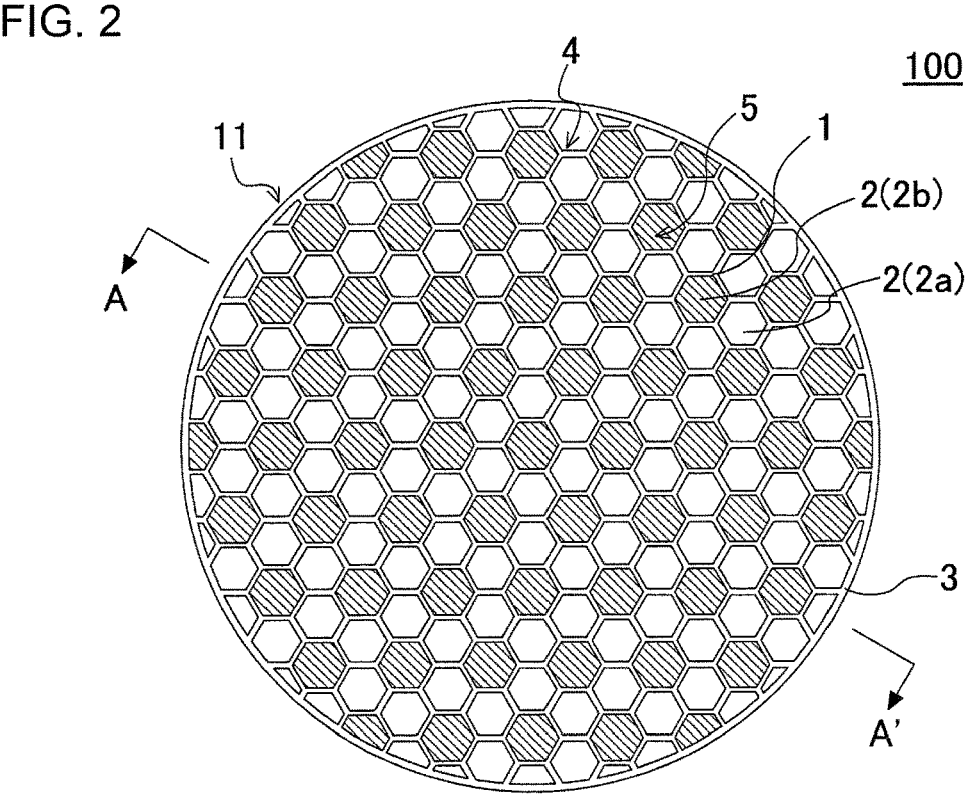
FIG. 2 is a plan view schematically showing the inflow end face of the honeycomb filter shown in FIG. 1.
Figure 3:
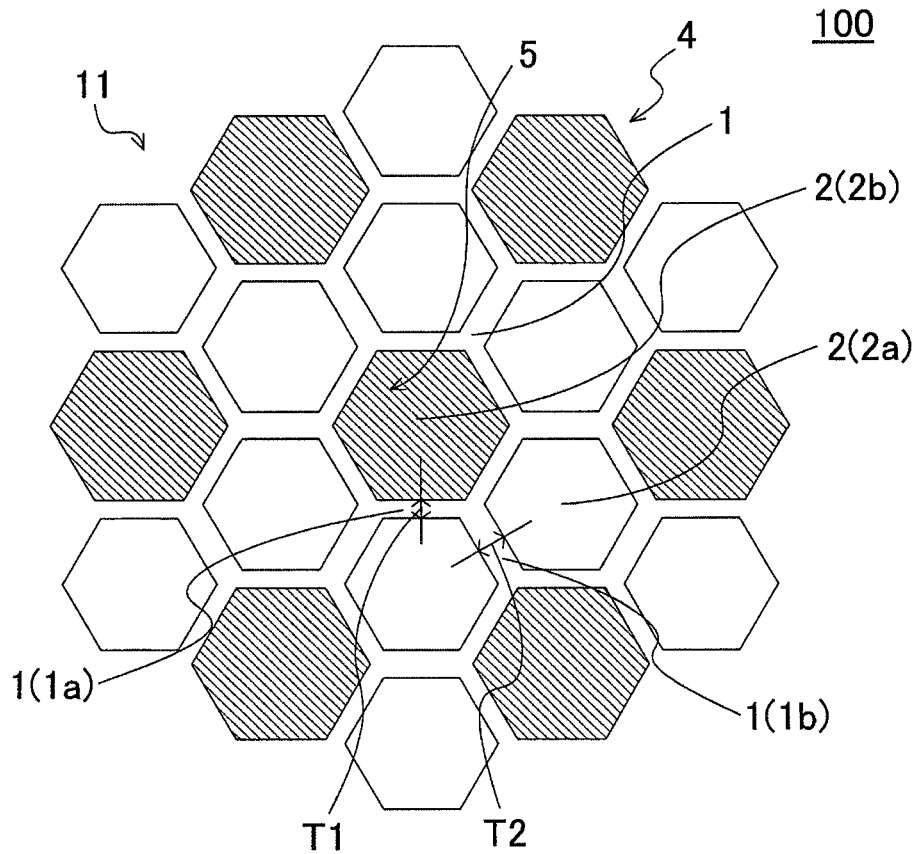
FIG. 3 is an enlarged plan view showing an enlarged part of the inflow end face shown in FIG. 2.
Figure 4:
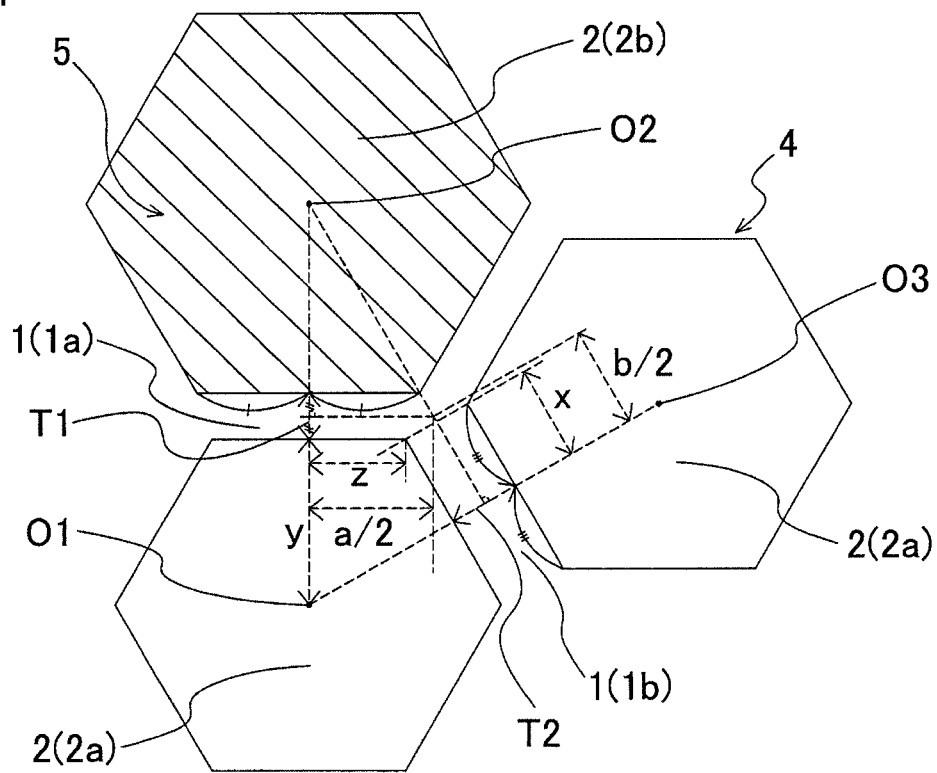
FIG. 4 is a schematic diagram for explaining a thickness T1 of a first partition wall and a thickness T2 of a second partition wall shown in FIG. 3.
Figure 5:
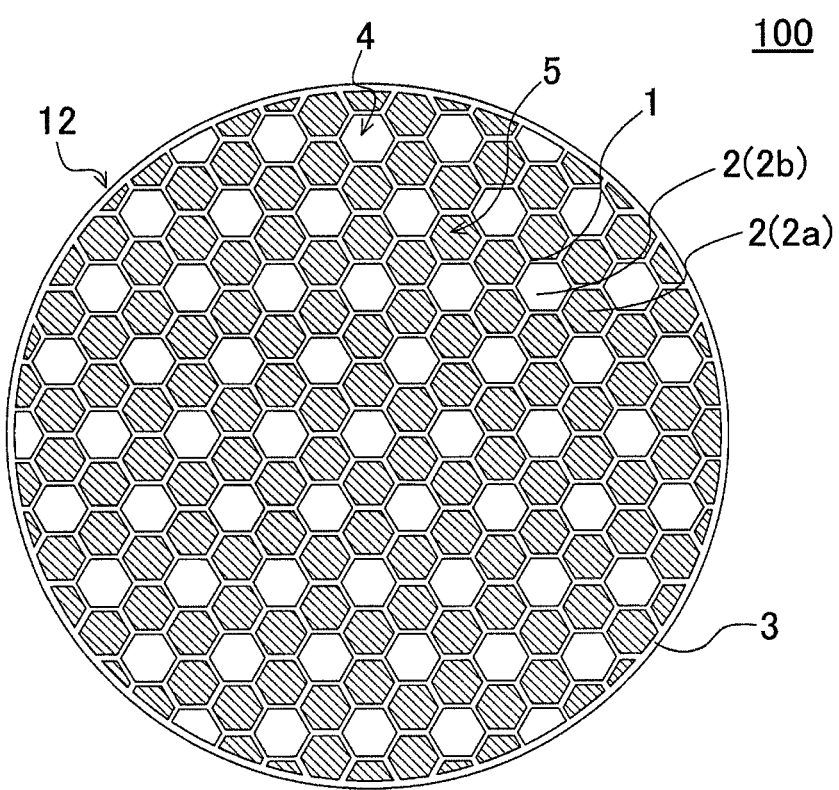
FIG. 5 is a plan view schematically showing an outflow end face of the honeycomb filter shown in FIG. 1.
Figure 6:
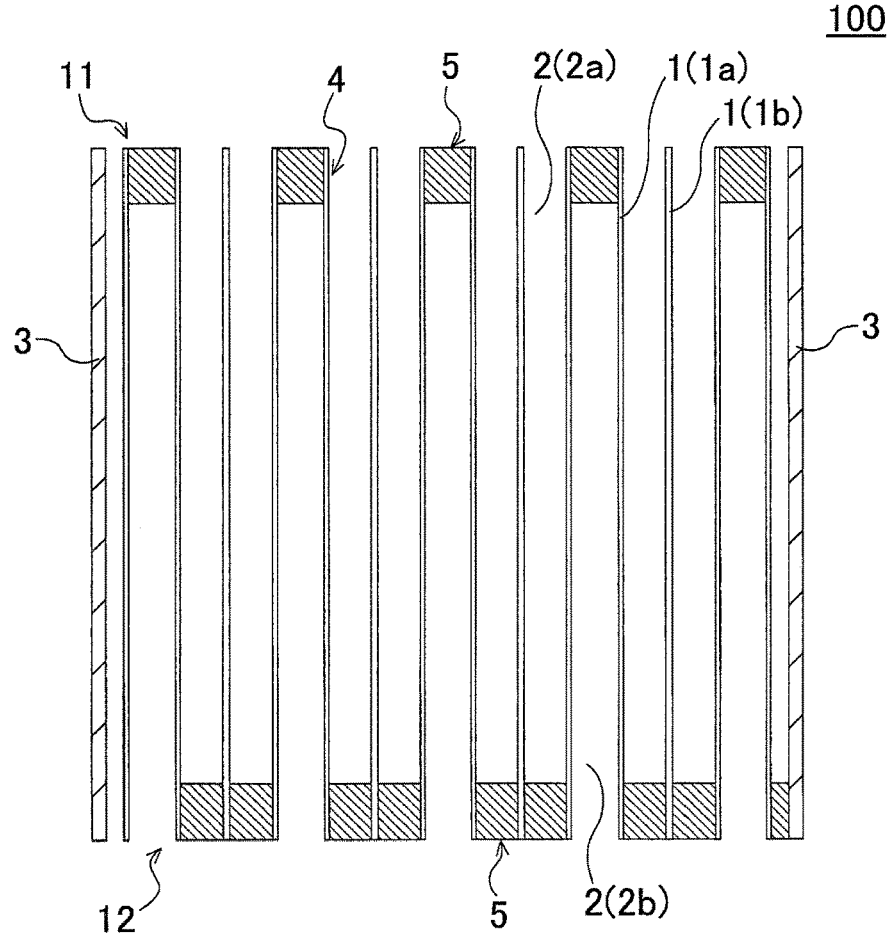
FIG. 6 is a sectional view schematically showing a section taken along A-A' of FIG. 2.

(1) Honeycomb Filter:

An embodiment of the honeycomb filter in accordance with the present invention is a honeycomb filter 100 shown in FIG. 1 to FIG. 6. FIG. 1 is a perspective view schematically showing the embodiment of the honeycomb filter in accordance with the present invention observed from an inflow end face side of the honeycomb filter. FIG. 2 is a plan view schematically showing the inflow end face of the honeycomb filter shown in FIG. 1. FIG. 3 is an enlarged plan view showing an enlarged part of the inflow end face shown in FIG. 2. FIG. 4 is a schematic diagram for explaining a thickness T1 of a first partition wall and a thickness T2 of a second partition wall shown in FIG. 3. FIG. 5 is a plan view schematically showing an outflow end face of the honeycomb filter shown in FIG. 1. FIG. 6 is a sectional view schematically showing a section taken along A-A' of FIG. 2.

The honeycomb filter 100 is provided with a honeycomb substrate 4 and plugging portions 5. The honeycomb substrate 4 is pillar-shaped, and has an inflow end face 11 and an outflow end face 12. The honeycomb substrate 4 has porous partition walls 1 provided, surrounding a plurality of cells 2 that extend from the inflow end face 11 to the outflow end face 12. The honeycomb substrate 4 shown in FIG. 1 and the like further has a circumferential wall 3 provided, surrounding the partition walls 1. In the present invention, the cells 2 mean the spaces surrounded by the partition walls 1.

The plugging portions 5 are provided at the end portion on either the inflow end face 11 side or the outflow end face 12 side of the cells 2 formed in the honeycomb substrate 4 to seal the open ends of the cells 2. Hereinafter, the cells 2 having the plugging portions 5 provided at the end portion on the outflow end face 12 side will be referred to as "the inflow cells 2a." The cells 2 having the plugging portions 5 provided at the end portion on the inflow end face 11 side will be referred to as "the outflow cells 2b."

In the honeycomb filter 100, each of the cells 2 has a hexagonal shape in a section that is orthogonal to the extending direction of the cells 2. In other words, in the section that is orthogonal to the extending direction of the cells 2, the inflow cells 2a have a hexagonal shape and the outflow cells 2b also have a hexagonal shape. Hereinafter, the shape of the cells in the section that is orthogonal to the extending direction of the cells 2 may be referred to as "the sectional shape of the cells" or simply as "the shape of the cells." In the present specification, the term "hexagonal shape" includes a hexagonal shape, a shape in which at least one corner of a hexagonal shape is formed by a curved line, and a shape in which at least one corner of a hexagonal shape is linearly chamfered.

The plurality of cells 2 have a structure in which a plurality of inflow cells 2a surround the periphery of one outflow cell 2b such that one side of the inflow cell 2a (one side of the hexagonal shape) and one side of the outflow cell 2b (one side of the hexagonal shape) adjacent thereto are parallel. The honeycomb filter 100 shown in FIG. 1 to FIG. 6 has a structure in which six inflow cells 2a surround the periphery of one outflow cell 2b. In the present specification, the foregoing term "parallel" means "substantially parallel," which will be described later. The term "substantially parallel" means the positional relationship between two sides which are parallel and which are in a state in which one side of the two parallel sides is inclined within a range of ±15°.

In the honeycomb filter 100, the partition wall 1 provided between the inflow cell 2a and the outflow cell 2b will be referred to as a "first partition wall 1a." Further, the partition wall 1 provided between the inflow cells 2a will be referred to as a "second partition wall 1b." Further, the honeycomb filter 100 has an important characteristic regarding the configurations of the first partition walls 1a and the second partition walls 1b. More specifically, at least one first partition wall 1a among the first partition walls 1a is configured such that the value of T2/T1, which is the value of the ratio of a thickness T2 of the second partition wall 1b with respect to a thickness T1 of the first partition wall 1a is greater than 1.0 and below 2.5. Hereinafter, the value of the ratio of the thickness T2 of the second partition wall 1b with respect to the thickness T1 of the first partition wall 1a may be referred to simply as "the value of T2/T1." When determining the value of T2/T1, the second partition wall 1b for which the thickness T2 is to be determined is to have at least one end side thereof connected to the first partition wall 1a for which the thickness T1 is to be determined.

Further, in the honeycomb filter 100, the total open frontal area of the honeycomb substrate 4 is greater than 35% and equal to or less than 95%. The term "total open frontal area" of the honeycomb substrate 4 means the percentage of the ratio of the total opening area of the cells 2 formed in the honeycomb substrate 4 with respect to the section area that is orthogonal to the extending direction of the cells 2 of the honeycomb substrate 4. The value of the section area that is orthogonal to the extending direction of the cells 2 of the honeycomb substrate 4 is not to include the area of the circumferential wall 3 disposed at the outermost circumference of the honeycomb substrate 4.

The honeycomb filter 100 can be suitably used as, for example, a filter that traps PM in exhaust gas. Further, the honeycomb filter 100 can achieve a low pressure loss when in use, as compared with conventional honeycomb filters. In particular, the honeycomb filter 100 can effectively suppress an increase in pressure loss attributable to the accumulation of PM on the surfaces of the partition walls 1, thereby achieving a lower pressure loss. More specifically, in the honeycomb filter 100, setting the thickness T2 of the second partition walls 1b to be relatively greater causes the total volume of the pores in the second partition walls 1b to relatively increase, so that exhaust gas easily passes through the pores of the second partition walls 1b. Therefore, even when PM, such as soot, accumulates on the surfaces of the first partition walls 1a with a resultant increase in the permeation resistance of the first partition walls 1a, the exhaust gas flowing into the inflow cells 2a smoothly flows into the outflow cells 2b through the pores of the second partition walls 1b. Thus, the low pressure loss of the honeycomb filter 100 can be achieved. In particular, the first partition walls 1a provide the mainstream of exhaust gas that flows from the inflow cells 2a to the outflow cells 2b, and therefore tend to easily accumulate PM, such as soot, thus easily leading to an increase in the permeation resistance as PM accumulates. In the honeycomb filter 100, if the permeation resistance of the first partition walls 1a increases, the second partition walls 1b can be used extremely effectively as the through channels of exhaust gas.

Further, as compared with the first partition walls 1a, the second partition walls 1b contribute less to an increase in pressure loss in the initial state of use. Hence, even when the thickness T2 of the second partition walls 1b is relatively increased, an excessive increase in pressure loss of the honeycomb filter 100 in the initial state of use can be suppressed by setting the total open frontal area of the honeycomb substrate 4 to the foregoing value range.

The honeycomb filter 100 may be configured such that the value of T2/T1 is greater than 1.0 and below 2.5 in at least one first partition wall 1a among all the first partition walls 1a provided between the inflow cells 2a and the outflow cells 2b. Alternatively, the honeycomb filter 100 may be configured such that the foregoing value of T2/T1 is greater than 1.0 and below 2.5 in all first partition walls 1a provided between the inflow cells 2a and the outflow cells 2b. If the value of T2/T1 is equal to or less than 1.0, then a sufficient amount of exhaust gas passing through the pores of the second partition walls 1b cannot be secured, thus making it difficult to obtain adequate effect for lowering the pressure loss in some cases. On the other hand, if the value of T2/T1 is equal to or more than 2.5, then the second partition walls 1b would be relatively too thick, thus making it difficult to obtain adequate effect for lowering the pressure loss in some cases. Further alternatively, the honeycomb filter 100 may be configured such that the foregoing value of T2/T1 is greater than 1.0 and below 2.5 in all the first partition walls 1a.

The value of T2/T1 is preferably greater than 1.0 and equal to or less than 2.4, and further preferably equal to or less than 2.0. In addition, the lower limit value of T2/T1 is further preferably 1.05 and yet further preferably 1.10. There are no particular restrictions on the specific thicknesses of the first partition walls 1a and the second partition walls 1b.

Referring now to FIG. 4, a description will be given of the method for measuring the thickness T1 of the first partition walls 1a and the thickness T2 of the second partition walls 1b. As shown in FIG. 4, the measurement range that includes the first partition walls 1a and the second partition walls 1b to be measured is first determined. More specifically, a range that includes one outflow cell 2b having one side thereof defined by the first partition wall 1a to be measured, and the two inflow cells 2a which are adjacent to the outflow cell 2b and are adjacent to each other is selected as the measurement range. By setting such a range as the measurement range, the first partition wall 1a to be measured and the second partition wall 1b connected to the first partition wall 1a are included in the measurement range.

Subsequently, as shown in FIG. 4, the center of gravity of one inflow cell 2a out of the two inflow cells 2a is defined as a center of gravity O1, and the center of gravity of the outflow cell 2b adjacent to the one inflow cell 2a is defined as a center of gravity O2. Further, the center of gravity of another inflow cell 2a that is adjacent to both the inflow cell 2a of the center of gravity O1 and the outflow cell 2b of the center of gravity O2 is defined as a center of gravity O3. The thickness T1 of the first partition walls 1a is defined as the thickness of the first partition wall 1a on a first segment that connects the center of gravity O1 and the center of gravity O2 (T1 in FIG. 4). The thickness T2 of the second partition walls 1b is defined as the thickness of the second partition wall 1b on a second segment that connects the center of gravity O1 and the center of gravity O3 (T2 in FIG. 4).

The thickness T1 of the first partition wall 1a and the thickness T2 of the second partition wall 1b can be measured using, for example, a microscope. As the microscope, KEYENCE VHX-1000 (trade name), for example, can be used.

Further, in the plan view given in FIG. 4, a virtual auxiliary triangle having three segments described below is drawn, and the length of each side constituting the hexagonal shape of the inflow cell 2a can be defined as described below by utilizing the drawn auxiliary triangle. A first segment for drawing the auxiliary triangle is the first segment that connects the center of gravity O1 and the center of gravity O2. A second segment is the second segment that connects the center of gravity O1 and the center of gravity O3. A third segment is the third segment that has the center of gravity O2 as the start point thereof and bisects the second segment. In the second segment, the portion actually utilized for drawing the auxiliary triangle is the half on the center of gravity O1 side of the second segment bisected by the third segment.

The value that is half the length of the side disposed adjacently to the outflow cell 2b among the six sides constituting the hexagonal shape of the one inflow cell 2a indicates the length denoted by "z" in FIG. 4. Therefore, the length of the side disposed adjacently to the outflow cell 2b among the six sides constituting the hexagonal shape of the one inflow cell 2a can be denoted by "a length 2z."

The value that is half the length of the side disposed adjacently to another inflow cell 2a among the six sides constituting the hexagonal shape of the one inflow cell 2a indicates the length denoted by "x" in FIG. 4. Therefore, the length of the side disposed adjacently to another inflow cell 2a among the six sides constituting the hexagonal shape of the one inflow cell 2a can be denoted by "a length 2x."

Regarding the lengths of the six sides constituting the hexagonal shape of the inflow cell 2a, the length 2z and the length 2x may be different. In the case where the length 2z and the length 2x among the lengths of the sides constituting the hexagonal shape of the inflow cell 2a are the same, the inflow cell 2a has, for example, a regular hexagonal shape.

In FIG. 4, the length denoted by "y" indicates the distance from the center of gravity O1 of the one inflow cell 2a to the first partition wall 1a. Hence, the cell pitch of the one inflow cell 2a can be denoted by "a cell pitch 2y."

Further, the length of the first partition wall 1a in the direction orthogonal to the thickness T1 of the first partition wall 1a and the length of the second partition wall 1b in the direction orthogonal to the thickness T2 of the second partition wall 1b can be defined as described below. First, as shown in FIG. 4, a first auxiliary line which passes through the midpoint of the thickness T1 of the first partition wall 1a and which is perpendicular to the first segment is further drawn in the foregoing drawn auxiliary triangle. In addition, a second auxiliary line which passes through the midpoint of the thickness T2 of the second partition wall 1b and which is perpendicular to the second segment is further drawn in the foregoing drawn auxiliary triangle.

Then, a third auxiliary line parallel to the first segment is drawn from the intersection point of the first auxiliary line and the second auxiliary line, as shown in FIG. 4. Further, a fourth auxiliary line parallel to the second segment is drawn from the intersection point of the first auxiliary line and the second auxiliary line. In FIG. 4, the distance between the first segment and the third auxiliary line is denoted by "a/2." Further, the distance between the second segment and the fourth auxiliary line is denoted by "b/2."

In FIG. 4, the length denoted by "a/2" indicates a value that is half the length of the first partition wall 1a. Accordingly, the length of the first partition wall 1a can be denoted by a "length a" in FIG. 4. In FIG. 4, the length denoted by "b/2" indicates a value that is half the length of the second partition wall 1b. Accordingly, the length of the second partition wall 1b can be denoted by a "length b" in FIG. 4.

The total open frontal area of the honeycomb substrate 4 is greater than 35% and equal to or less than 95%. The lower limit value of the total frontal area of the honeycomb substrate 4 is preferably 47% and further preferably 53%. The upper limit value of the total open frontal area of the honeycomb substrate 4 is preferably 77% and further preferably 72%.

The thickness T1 of the first partition wall 1a is preferably 70 to 350 μm, further preferably 100 to 325 μm, and especially preferably 130 to 300 μm. This arrangement makes it possible to achieve the honeycomb filter 100 having a low pressure loss while maintaining isostatic strength.

In the honeycomb filter 100, the hydraulic diameter of the inflow cells 2a is preferably greater than the hydraulic diameter of the outflow cells 2b. This arrangement makes it easier to exhibit the effect for achieving a low pressure loss while maintaining the isostatic strength. The value of the hydraulic diameter is calculated according to "4×(cross sectional area)/(circumferential length)" on the basis of the cross sectional area and the circumferential length of each of the cells 2.

The hydraulic diameter of the inflow cells 2a is preferably 0.5 to 1.5 mm, further preferably 0.6 to 1.4 mm, and especially preferably 0.7 to 1.3 mm. In addition, the hydraulic diameter of the inflow cells 2a is preferably 1.0 to 1.7 times and further preferably 1.3 to 1.7 times the hydraulic diameter of the outflow cells 2b.

The length of one side of the outflow cells 2b is preferably 0.5 to 1.6 mm, further preferably 0.5 to 1.3 mm, and especially preferably 0.5 to 1.0 mm. This arrangement makes it easy to exhibit the effect for achieving a low pressure loss while improving thermal shock resistance.

The porosity of the partition wall 1 of the honeycomb substrate 4 is preferably 35 to 70% and further preferably 40 to 65%. If the porosity of the partition walls 1 is below 35%, then the pressure loss may increase. If the porosity of the partition walls 1 exceeds 70%, then the strength of the honeycomb substrate 4 will be insufficient, thus making it difficult to hold the honeycomb filter 100 with a sufficient gripping force when placing the honeycomb filter 100 in a can body used for an exhaust gas purifier. The porosity of the partition walls 1 is to be indicated by a value measured by a mercury porosimeter. As the mercury porosimeter, Micromeritics Autopore 9500 (trade name), for example, may be used.

In the cross section that is orthogonal to the extending direction of the cells 2, the inflow cells 2a and the outflow cells 2b have hexagonal shapes. In the honeycomb filter 100, the inflow cells 2a have a regular hexagonal shape, and the outflow cells 2b also have a regular hexagonal shape. Further, the shape of the inflow cells 2a and the shape of the outflow cells 2b are similar but are different in size.

The materials of the partition walls 1 are preferably various types of ceramics, metals or the like, the main components of which are oxides or non-oxides from the viewpoints of strength, heat resistance, durability and the like. More specifically, the ceramics are preferably composed of a material that contains at least one selected from a material group that includes, for example, cordierite, mullite, alumina, spinel, silicon carbide, silicon nitride, and aluminum titanate. As the metals, Fe—Cr—Al based metal and silicon metal or the like may be used. The main component is preferably one or equal to or more than two materials selected from among the foregoing materials. Especially preferably, the main component is one or equal to or more than two selected from a material group that includes alumina, mullite, aluminum titanate, cordierite, silicon carbide, and silicon nitride, from the viewpoint of high strength, high heat resistance and the like. Further, the ceramics material may be, for example, a composite material obtained by bonding the particles of silicon carbide by using cordierite as a bonding agent. Further, from the viewpoint of high thermal conductivity, high heat resistance and the like, silicon carbide or silicon-silicon carbide composite material is particularly suitable. The term "main component" in this case means a component that exists in the component by equal to or more than 50 percent by mass, preferably equal to or more than 70 percent by mass, and further preferably equal to or more than 80 percent by mass.

There are no particular restrictions on the material of the plugging portions 5, and the materials for the partition walls 1 mentioned above can be suitably used.

There are no particular restrictions on the overall shape of the honeycomb filter 100. Regarding the overall shape of the honeycomb filter 100, the shape of the inflow end face 11 and the outflow end face 12 are preferably circular or elliptical, and especially preferably circular. Although there are no particular restrictions on the size of the honeycomb filter 100, the length from the inflow end face 11 to the outflow end face 12 is preferably 50 to 300 mm. If the overall shape of the honeycomb filter 100 is round pillar-shaped, then the diameters of the inflow end face 11 and the outflow end face 12 are preferably 100 to 400 mm.

The honeycomb filter 100 can be suitably used as a member for the exhaust gas purification of an internal-combustion engine. The honeycomb filter 100 may be configured such that at least either the surfaces of the partition walls 1 of the honeycomb substrate 4 or the pores of the partition walls 1 are loaded with a catalyst for exhaust gas purification.

Figure 7:
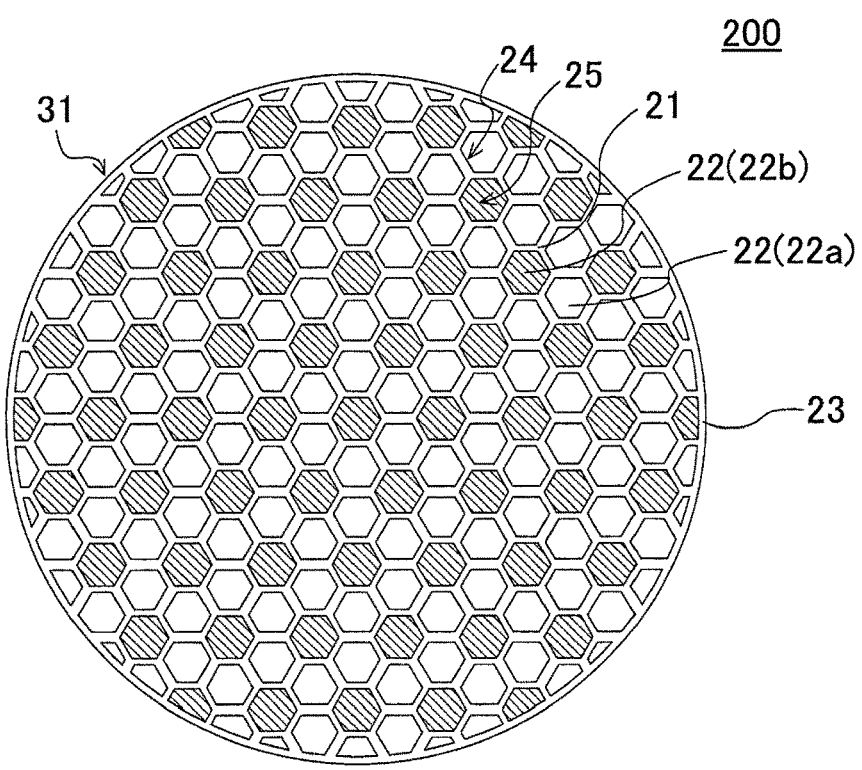
FIG. 7 is a plan view schematically showing an inflow end face of another embodiment of the honeycomb filter in accordance with the present invention.
Figure 8:
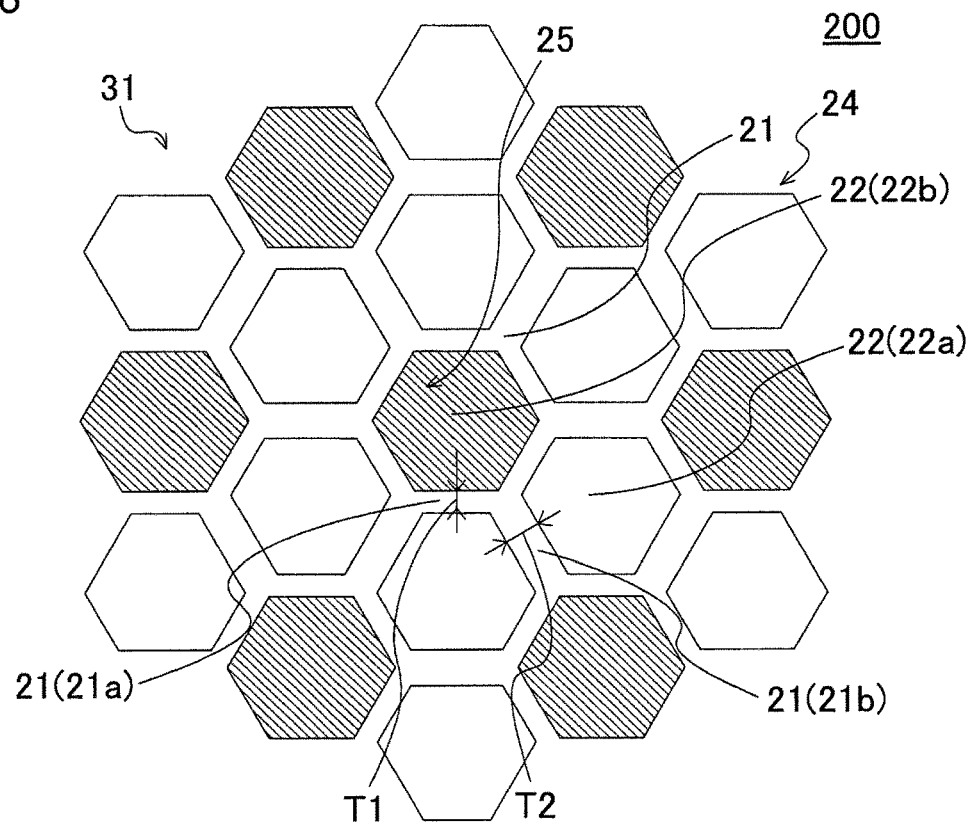
FIG. 8 is an enlarged plan view showing an enlarged part of the inflow end face shown in FIG. 7.

Referring now to FIG. 7 and FIG. 8, another embodiment of the honeycomb filter in accordance with the present invention will be described. FIG. 7 is a plan view schematically showing the inflow end face of another embodiment of the honeycomb filter in accordance with the present invention. FIG. 8 is an enlarged plan view showing an enlarged part of the inflow end face shown in FIG. 7.

A honeycomb filter 200 shown in FIG. 7 and FIG. 8 is provided with a honeycomb substrate 24 and plugging portions 25. The honeycomb substrate 24 is pillar-shaped, and has an inflow end face 31 and an outflow end face (not shown). The honeycomb substrate 24 has porous partition walls 21 provided, surrounding a plurality of cells 22 that extend from the inflow end face 31 to the outflow end face (not shown). The honeycomb substrate 24 shown in FIG. 7 further has a circumferential wall 23 provided, surrounding the partition walls 21.

In the honeycomb filter 200, each of the inflow cells 22a has a hexagonal shape and each of the outflow cells 22b has a hexagonal shape in the section that is orthogonal to the extending direction of the cells 22. The plurality of cells 22 have a structure in which a plurality of inflow cells 22a surround the periphery of one outflow cell 22b such that one side of the inflow cell 22a and one side of the outflow cell 22b adjacent thereto are parallel. The honeycomb filter 200 shown in FIG. 7 has a structure in which six inflow cells 22a surround the periphery of one outflow cell 22b.

In the honeycomb filter 200, the partition wall 21 provided between the inflow cell 22a and the outflow cell 22b will be referred to as a "first partition wall 21a." Further, the partition wall 21 provided between the inflow cells 22a will be referred to as a "second partition wall 21b." In the honeycomb filter 200, at least one first partition wall 21a among the first partition walls 21a is configured such that the value of T2/T1, which is the value of the ratio of a thickness T2 of the second partition wall 21b with respect to a thickness T1 of the first partition wall 21a, is greater than 1.0 and below 2.5.

In the honeycomb filter 200, the total open frontal area of the honeycomb substrate 24 is greater than 35% and equal to or less than 95%.

The honeycomb filter 200 shown in FIG. 7 and FIG. 8 differs in the shape of the inflow cells 22a from the honeycomb filter 100 shown in FIG. 1 to FIG. 5 described above. More specifically, in the honeycomb filter 200, the inflow cells 22a have a hexagonal shape other than a regular hexagonal shape in the section that is orthogonal to the extending direction of the cells 22. In the case where the inflow cells 22a have a hexagonal shape other than a regular hexagonal shape, the inflow cells 22a preferably have a hexagonal shape in which the lengths of at least one pair of opposing sides are different. The term "at least one pair of opposing sides" means at least one pair of opposing sides in a hexagonal shape of each of the inflow cells 22a. Further preferably, the inflow cells 22a have a hexagonal shape in which the lengths of the opposing sides of the hexagonal shape are different from each other. Setting the inflow cells 22a to have the hexagonal shape as described above makes it possible to effectively prevent the total open frontal area of the honeycomb substrate 24 from becoming excessively small when the value of T2/T1 is set to be greater than 1.0. Thus, the influence of an increase in pressure loss attributable to a decrease in the total open frontal area will be suppressed when the value of T2/T1 is set to be greater than 1.0. This enables a lower pressure loss to be achieved.

Figure 9:
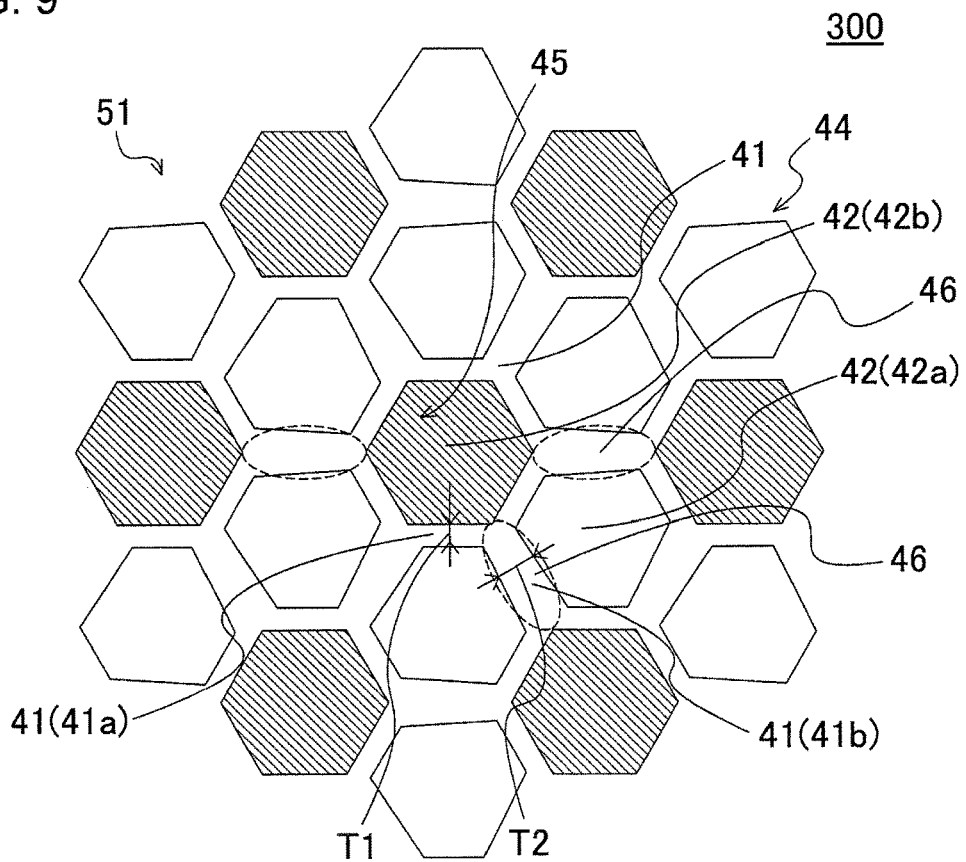
FIG. 9 is an enlarged plan view showing an enlarged part of an inflow end face of yet another embodiment of the honeycomb filter in accordance with the present invention.

Referring now to FIG. 9, a description will be given of yet another embodiment of the honeycomb filter in accordance with the present invention. FIG. 9 is an enlarged plan view showing an enlarged part of an inflow end face of another embodiment of the honeycomb filter in accordance with the present invention.

The honeycomb filter 300 shown in FIG. 9 is provided with a honeycomb substrate 44 and plugging portions 45. The honeycomb substrate 44 is pillar-shaped, and has an inflow end face 51 and an outflow end face (not shown). The honeycomb substrate 44 has porous partition walls 41 provided, surrounding a plurality of cells 42 that extend from the inflow end face 51 to the outflow end face (not shown).

In the honeycomb filter 300 shown in FIG. 9, each of inflow cells 42a has a hexagonal shape other than a regular hexagonal shape and each of outflow cells 42b has a regular hexagonal shape in the section that is orthogonal to the extending direction of the cells 42. The honeycomb filter 300 has a structure in which six inflow cells 42a surround the periphery of one outflow cell 42b.

The honeycomb filter 300 is also configured such that the value of T2/T1 is greater than 1.0 and below 2.5. Further, in the honeycomb filter 300, the total open frontal area of the honeycomb substrate 44 is greater than 35% and equal to or less than 95%.

In the honeycomb filter 300, a second partition wall 41b has a thickness inclination section 46 that causes a thickness T2 of the second partition wall to decrease or increase toward a portion connected with a first partition wall 41a. The honeycomb filter 300 has both the thickness inclination section 46 that causes the thickness T2 of the second partition wall to increase toward the portion connected with the first partition wall 41a and the thickness inclination section 46 that causes the thickness T2 of the second partition wall to decrease toward the portion connected with the first partition wall 41a.

For example, having the thickness inclination section 46 that causes the thickness T2 of the second partition wall to increase toward the portion connected with the first partition wall 41a enables the improvement of the thermal shock resistance of the honeycomb filter 300. More specifically, the connection portion between the second partition wall 41b and the first partition wall 41a relatively tends to incur stress, so that the structural strength of the honeycomb filter can be improved by making the connection portion between the second partition wall 41b and the first partition wall 41a relatively thicker. This can improve the thermal shock resistance in the regeneration process for burning and removing PM trapped by the honeycomb filter 300.

Meanwhile, having the thickness inclination section 46 that causes the thickness T2 of the second partition wall to decrease toward the portion connected with the first partition wall 41a enables the honeycomb filter 300 to have a lower pressure loss.

(2) Manufacturing Method for the Honeycomb Filters:

The method for manufacturing the honeycomb filters in accordance with the present invention will now be described.

First, a plastic kneaded material for producing the honeycomb substrate is prepared. The kneaded material for producing the honeycomb substrate can be prepared by adding an additive, such as a binder, and water, as appropriate, to a material selected from the foregoing suitable material group of the partition walls as a raw material powder.

Subsequently, the prepared kneaded material is subjected to extrusion thereby to obtain a pillar-shaped honeycomb formed body having partition walls that define a plurality of cells, and a circumferential wall provided on the outermost circumference. In the extrusion, an extrusion die can be used, in which a slit providing an inverse shape of a honeycomb formed body that is to be formed is formed in the kneaded material extrusion surface thereof. The obtained honeycomb formed body may be dried by, for example, microwave and hot air.

Subsequently, the open ends of the cells are plugged by the same material as the material used for fabricating the honeycomb formed body, thereby forming the plugging portions. As the method for forming the plugging portions, a conventionally known honeycomb filter manufacturing method can be used.

Subsequently, the obtained honeycomb formed body is fired to produce a honeycomb filter. The firing temperature and the firing atmosphere vary according to the raw material, and those skilled in the art can select a firing temperature and a firing atmosphere that are best suited for a selected material. The method for manufacturing the honeycomb filter in accordance with the present invention is not limited to the method described above.

The following will describe the present invention in further detail by examples; however, the present invention is not limited at all by these examples.

Example 1

First, the kneaded material for producing a honeycomb substrate was prepared. In Example 1, as the raw material powder for preparing the kneaded material, a powder mixture was prepared by mixing silicon carbide (SiC) powder and silicon metal (Si) powder at a mass ratio of 80:20. A binder, a pore former, and water were added to the powder mixture to make the forming raw material. Then, the forming raw material was kneaded to produce a round pillar-shaped kneaded material.

Subsequently, the kneaded material was extruded by using a die for fabricating a honeycomb formed body, thereby obtaining a honeycomb formed body that has a round pillar-shaped overall shape.

Subsequently, the honeycomb formed body was dried by a microwave drier, and further dried by a hot air drier until completely dried. Then, both end faces of the honeycomb formed body were cut to predetermined dimensions.

Subsequently, plugging portions were formed on the dried honeycomb formed body. More specifically, first, a mask was provided on the inflow end face of the honeycomb formed body to cover the inflow cells. After that, the end portion of the masked honeycomb formed body was immersed in plugging slurry to fill unmasked outflow cell open ends with the plugging slurry. Then, also for the outflow end face of the honeycomb formed body, the open ends of the inflow cells were filled with the plugging slurry according to the same method described above. After that, the honeycomb formed body with the plugging portions formed therein was further dried by the hot air drier.

Subsequently, the honeycomb formed body with the plugging portions formed therein was degreased and fired to obtain the honeycomb filter.

According to the honeycomb filter of Example 1, the inflow cells 22a had a hexagonal shape other than a regular hexagonal shape, and the outflow cells 22b had a regular hexagonal shape, as shown by the honeycomb filter 200 in FIG. 7 and FIG. 8. The honeycomb filter of Example 1 had the cell structure in which six hexagonal inflow cells 22a surround the periphery of the outflow cells 22b having the regular hexagonal shape, as shown in FIG. 7 and FIG. 8. The hexagonal shape of the inflow cells 22a was a hexagonal shape in which the opposing sides of the hexagon have different lengths.

The porosity of the partition walls of the honeycomb filter of Example 1 was 41%. The diameter of the end faces was 266.7 mm and the length in the extending direction of the cells was 254.0 mm. The porosity of the partition walls is indicated by a value measured by a mercury porosimeter. Further, in the honeycomb filter of Example 1, the thickness T1 of the first partition wall 21a shown in FIG. 8 was 152.4 μm and the thickness T2 of the second partition wall 21b was 160.0 μm. In the honeycomb filter of Example 1, therefore, the value of the ratio of the thickness T2 of the second partition wall to the thickness T1 of the first partition wall (T2/T1) was 1.05. Table 1 shows the values of "Thickness T1 of first partition wall (μm)," "Thickness T2 of second partition wall (μm)," and "T2/T1."

Further, on the honeycomb filter of Example 1, the values of a length "a" of the first partition wall and a length "b" of the second partition wall as shown in FIG. 4 were determined. The results are shown in the columns of "Length a of first partition wall (mm)" and "Length b of second partition wall (mm)" in Table 2. Further, the values obtained by dividing the length a (mm) of the first partition wall by the length b (mm) of the second partition wall are shown in the column of "a/b" of Table 2. The cell density of the honeycomb filter of Example 1 is shown in the column of "Cell density (cells/cm$^2$)" of Table 2. Further, on the honeycomb filter of Example 1, the length denoted by "x" and the length denoted by "z" in FIG. 4 were determined. The results are shown in the columns of "x (mm)" and "z (mm)" of Table 2.

TABLE 1

|  | Porosity (%) | 1st partition wall thickness T1 (μm) | 2nd partition wall thickness T2 (μm) | T2/T1 | Total open frontal area (%) | Pressure loss ratio |
| --- | --- | --- | --- | --- | --- | --- |
| Comparative example 1 | 41 | 152.4 | 152.4 | 1.00 | 77 | 1.00 |
| Example 1 | 41 | 152.4 | 160.0 | 1.05 | 77 | 0.96 |
| Example 2 | 41 | 152.4 | 167.6 | 1.10 | 76 | 0.95 |
| Example 3 | 41 | 152.4 | 228.6 | 1.50 | 76 | 0.90 |
| Example 4 | 41 | 152.4 | 304.8 | 2.00 | 75 | 0.84 |
| Comparative example 2 | 41 | 228.6 | 228.6 | 1.00 | 69 | 1.00 |
| Example 5 | 41 | 228.6 | 240.0 | 1.05 | 68 | 0.97 |
| Example 6 | 41 | 228.6 | 251.5 | 1.10 | 68 | 0.96 |
| Example 7 | 41 | 228.6 | 342.9 | 1.50 | 67 | 0.91 |
| Example 8 | 41 | 228.6 | 457.2 | 2.00 | 64 | 0.88 |
| Comparative example 3 | 41 | 304.8 | 304.8 | 1.00 | 61 | 1.00 |
| Example 9 | 41 | 304.8 | 320.0 | 1.05 | 61 | 0.96 |
| Example 10 | 41 | 304.8 | 335.3 | 1.10 | 60 | 0.96 |
| Example 11 | 41 | 304.8 | 457.2 | 1.50 | 57 | 0.94 |
| Example 12 | 41 | 304.8 | 609.6 | 2.00 | 53 | 0.93 |
| Comparative example 4 | 41 | 304.8 | 762.0 | 2.50 | 47 | 1.01 |

TABLE 2

|  | Length a of 1st partition wall (mm) | Length b of 2nd partition wall (mm) | a/b | Cell density (cells/cm$^2$) | x (mm) | z (mm) |
| --- | --- | --- | --- | --- | --- | --- |
| Comparative example 1 | 0.910 | 0.910 | 1.00 | 46 | 0.411 | 0.411 |
| Example 1 | 0.902 | 0.910 | 1.01 | 47 | 0.411 | 0.407 |
| Example 2 | 0.895 | 0.910 | 1.02 | 48 | 0.411 | 0.403 |
| Example 3 | 0.834 | 0.910 | 1.09 | 52 | 0.411 | 0.373 |
| Example 4 | 0.758 | 0.910 | 1.20 | 59 | 0.411 | 0.335 |
| Comparative example 2 | 0.910 | 0.910 | 1.00 | 46 | 0.389 | 0.389 |
| Example 5 | 0.899 | 0.910 | 1.01 | 47 | 0.389 | 0.383 |
| Example 6 | 0.888 | 0.910 | 1.03 | 48 | 0.389 | 0.378 |
| Example 7 | 0.796 | 0.910 | 1.14 | 55 | 0.389 | 0.332 |
| Example 8 | 0.681 | 0.910 | 1.34 | 68 | 0.389 | 0.275 |
| Comparative example 3 | 0.910 | 0.910 | 1.00 | 46 | 0.367 | 0.367 |
| Example 9 | 0.895 | 0.910 | 1.02 | 48 | 0.367 | 0.359 |
| Example 10 | 0.880 | 0.910 | 1.03 | 49 | 0.367 | 0.352 |
| Example 11 | 0.758 | 0.910 | 1.20 | 59 | 0.367 | 0.291 |
| Example 12 | 0.605 | 0.910 | 1.50 | 79 | 0.367 | 0.215 |
| Comparative example 4 | 0.453 | 0.910 | 2.01 | 114 | 0.367 | 0.138 |

The test of pressure loss performance evaluation was carried out on the honeycomb filter of Example 1 according to the method described below. The results are shown in Table 1.

(Pressure Loss Performance Evaluation)

In the pressure loss performance evaluation, the values of the pressure losses of "reference honeycomb filters" subjected to the measurement under the same condition were established as the reference values, and the honeycomb filter of each example was subjected to the pressure loss performance evaluation. More specifically, the pressure losses in the air volume of 10 m³/min. were measured by using a large wind tunnel device. In the measurement of the pressure loss, the pressure losses in a state in which soot of 6 g/L had been accumulated on each honeycomb filter were measured. In the case where the value of the pressure loss of the reference honeycomb filter was denoted by $P_0$ and the value of the pressure loss of the honeycomb filter of each example was denoted by $P_1$, the value calculated according to "$P_1/P_0$" was defined as the result of the pressure loss performance evaluation. The results are shown in the column of "Pressure loss ratio" in Table 1.

In the pressure loss performance evaluation, the reference honeycomb filters are as shown below.

In Examples 1 to 4, the reference honeycomb filter is defined as Comparative example 1.

In Examples 5 to 8, the reference honeycomb filter is defined as Comparative example 2.

In Examples 9 to 12 and Comparative example 4, the reference honeycomb filter is defined as Comparative example 3.

In Examples 13 to 16, the reference honeycomb filter is defined as

Comparative example 5.

In Examples 17 to 21 and Comparative examples 7 to 9, the reference honeycomb filter is defined as Comparative example 6.

In Examples 22 to 25, the reference honeycomb filter is defined as Comparative example 10.

In Examples 26 to 29, the reference honeycomb filter is defined as Comparative example 11.

Examples 2 to 12 and Comparative Examples 1 to 4

The honeycomb filters were produced according to the same method as that for Example 1 except that the thickness T1 (μm) of the first partition wall, the thickness T2 (μm) of the second partition wall, the length a (mm) of the first partition wall, the length b (mm) of the second partition wall and the like had been changed as shown in Table 1 and Table 2. The honeycomb filters of Examples 2 to 12 and Comparative example 4 were subjected to the test of the pressure loss performance evaluation according to the same method as that for Example 1. The results are shown in Table 1. The honeycomb filters of Comparative examples 1 to 3 are honeycomb filters in which the thickness T1 of the first partition wall and the thickness T2 of the second partition wall have the same value.

Example 13

For Example 13, the kneaded material prepared according to the same method as that for the kneaded material prepared for Example 1 was used to produce the honeycomb filter having the cell structure shown in FIG. 2 and FIG. 3. More specifically, the inflow cells 2a of the honeycomb filter of Example 13 had a regular hexagonal shape and the outflow cells 2b also had a regular hexagonal shape, as with the honeycomb filter 100 shown in FIG. 2 and FIG. 3. Further, the honeycomb filter of Example 13 had a cell structure in which six regular hexagonal inflow cells 2a were arranged to surround the periphery of the outflow cell 2b having the regular hexagonal shape, as shown in FIG. 2 and FIG. 3.

The porosity of the partition walls of the honeycomb filter of Example 13 was 41%. The diameter of the end faces was 266.7 mm, and the length in the extending direction of the cells was 254.0 mm. The porosities of the partition walls are denoted by the values measured by a mercury porosimeter. Further, in the honeycomb filter of Example 13, the thickness T1 of the first partition wall 1a shown in FIG. 3 was 152.4 μm, and the thickness T2 of the second partition wall 1b was 160.0 μm. Hence, in the honeycomb filter of Example 13, the value of the ratio of the thickness T2 of the second partition wall with respect to the thickness T1 of the first partition wall (T2/T1) was 1.05. Table 3 shows the values of the thickness T1 (μm) of the first partition wall, the thickness T2 (μm) of the second partition wall, and T2/T1.

On the honeycomb filter of Example 13, the values of the length a of the first partition wall and the length b of the second partition wall shown in FIG. 4 were determined. The results are shown in the columns of "Length a of first partition wall (mm)" and "Length b of second partition wall (mm)" of Table 4. In addition, the values obtained by dividing the length a (mm) of the first partition wall by the length b (mm) of the second partition wall are shown in the column of "a/b" of Table 4. The cell density of the honeycomb filter of Example 13 is shown in the column of "Cell density (cells/cm²)" of Table 4. Further, on the honeycomb filter of Example 13, the length denoted by "x" and the length denoted by "z" in FIG. 4 were determined. The results are shown in the columns of "x (mm)" and "z (mm)" of Table 4.

Examples 14 to 21 and Comparative Examples 5 to 9

The honeycomb filters were produced according to the same method as that for Example 13 except that the thickness T1 (μm) of the first partition wall, the thickness T2 (μm) of the second partition wall, the length a (mm) of the first partition wall, the length b (mm) of the second partition wall and the like had been changed as shown in Table 3 and Table 4. The honeycomb filters of Examples 14 to 20 and Comparative examples 7 to 9 were subjected to the test of the pressure loss performance evaluation according to the same method as that for Example 1. The results are shown in Table 3. The honeycomb filters of Comparative examples 5 and 6 are honeycomb filters in which the thickness T1 of the first partition wall and the thickness T2 of the second partition wall have the same value.

Examples 22 to 25 and Comparative Example 10

For Examples 22 to 25 and Comparative example 10, when preparing the kneaded material for producing the honeycomb substrates, the amount of a pore former added to the kneaded material prepared in Example 1 was changed so as to manufacture honeycomb filters, the porosity of partition walls of which was 63%. The thickness T1 (μm) of the first partition wall, the thickness T2 (μm) of the second partition wall, the length a (mm) of the first partition wall, the length b (mm) of the second partition wall and the like of the honeycomb filters of Examples 22 to 25 and Comparative example 10 are as shown in Table 5 and Table 6. The honeycomb filters of Examples 22 to 25 were subjected to the test of the pressure loss performance evaluation according to the same method as that for Example 1. The results are shown in Table 5. The honeycomb filter of Comparative example 10 is a honeycomb filter in which the thickness T1 of the first partition wall and the thickness T2 of the second partition wall have the same value.

Examples 26 to 29 and Comparative Example 11

For Examples 26 to 29 and Comparative example 11, as the kneaded material for producing the honeycomb substrates, the following kneaded material was prepared to produce cordierite honeycomb substrates. As the raw material powder for preparing the kneaded material, a powder mixture of cordierite, mullite, alumina, spinel and the like was prepared. A binder, a pore former, and water were added to the powder mixture to make the forming raw material. Then, the forming raw material was kneaded to produce a round pillar-shaped kneaded material.

The thickness T1 (μm) of the first partition wall, the thickness T2 (μm) of the second partition wall, the length a (mm) of the first partition wall, the length b (mm) of the second partition wall and the like of the honeycomb filters of Examples 26 to 29 and Comparative example 11 are as shown in Table 5 and Table 6. The honeycomb filters of Examples 26 to 29 were subjected to the test of the pressure loss performance evaluation according to the same method as that for Example 1. The results are shown in Table 5. The honeycomb filter of Comparative example 11 is a honeycomb filter in which the thickness T1 of the first partition wall and the thickness T2 of the second partition wall have the same value.

TABLE 3

|  | Porosity (%) | 1st partition wall thickness T1 (μm) | 2nd partition wall thickness T2 (μm) | T2/T1 | Total open frontal area (%) | Pressure loss ratio |
|---|---|---|---|---|---|---|
| Comparative example 5 | 41 | 152.4 | 152.4 | 1.00 | 77 | 1.00 |
| Example 13 | 41 | 152.4 | 160.0 | 1.05 | 76 | 0.96 |
| Example 14 | 41 | 152.4 | 167.6 | 1.10 | 76 | 0.96 |
| Example 15 | 41 | 152.4 | 228.6 | 1.50 | 75 | 0.91 |
| Example 16 | 41 | 152.4 | 304.8 | 2.00 | 73 | 0.86 |
| Comparative example 6 | 41 | 228.6 | 228.6 | 1.00 | 69 | 1.00 |
| Example 17 | 41 | 228.6 | 240.0 | 1.05 | 68 | 0.97 |
| Example 18 | 41 | 228.6 | 251.5 | 1.10 | 68 | 0.96 |
| Example 19 | 41 | 228.6 | 342.9 | 1.50 | 65 | 0.94 |
| Example 20 | 41 | 228.6 | 457.2 | 2.00 | 61 | 0.97 |
| Example 21 | 41 | 228.6 | 548.6 | 2.40 | 57 | 0.99 |
| Comparative example 7 | 41 | 228.6 | 571.5 | 2.50 | 55 | 1.08 |
| Comparative example 8 | 41 | 228.6 | 685.8 | 3.00 | 47 | 1.63 |
| Comparative example 9 | 41 | 304.8 | 762.0 | 2.50 | 35 | 4.8 |

TABLE 4

|  | Length a of 1st partition wall (mm) | Length b of 2nd partition wall (mm) | a/b | Cell density (cells/cm$^2$) | x (mm) | z (mm) |
|---|---|---|---|---|---|---|
| Comparative example 5 | 0.910 | 0.910 | 1.0 | 46 | 0.411 | 0.411 |
| Example 13 | 0.902 | 0.902 | 1.0 | 47 | 0.407 | 0.407 |
| Example 14 | 0.895 | 0.895 | 1.0 | 48 | 0.403 | 0.403 |
| Example 15 | 0.834 | 0.834 | 1.0 | 55 | 0.373 | 0.373 |
| Example 16 | 0.758 | 0.758 | 1.0 | 67 | 0.335 | 0.335 |
| Comparative example 6 | 0.910 | 0.910 | 1.0 | 46 | 0.389 | 0.389 |
| Example 17 | 0.899 | 0.899 | 1.0 | 48 | 0.383 | 0.383 |
| Example 18 | 0.888 | 0.888 | 1.0 | 49 | 0.378 | 0.378 |
| Example 19 | 0.796 | 0.796 | 1.0 | 61 | 0.332 | 0.332 |
| Example 20 | 0.681 | 0.681 | 1.0 | 83 | 0.275 | 0.275 |
| Example 21 | 0.590 | 0.590 | 1.0 | 111 | 0.229 | 0.229 |
| Comparative example 7 | 0.567 | 0.567 | 1.0 | 120 | 0.218 | 0.218 |
| Comparative example 8 | 0.453 | 0.453 | 1.0 | 188 | 0.160 | 0.160 |
| Comparative example 9 | 0.453 | 0.453 | 1.0 | 188 | 0.138 | 0.138 |

TABLE 5

| | Porosity (%) | 1st partition wall thickness T1 (μm) | 2nd partition wall thickness T2 (μm) | T2/T1 | Total open frontal area (%) | Pressure loss ratio |
|---|---|---|---|---|---|---|
| Comparative example 10 | 63 | 152.4 | 152.4 | 1.00 | 77 | 1.00 |
| Example 22 | 63 | 152.4 | 160.0 | 1.05 | 77 | 0.97 |
| Example 23 | 63 | 152.4 | 167.6 | 1.10 | 76 | 0.97 |
| Example 24 | 63 | 152.4 | 228.6 | 1.50 | 76 | 0.97 |
| Example 25 | 63 | 152.4 | 304.8 | 2.00 | 75 | 0.94 |
| Comparative example 11 | 58 | 152.4 | 152.4 | 1.00 | 77 | 1.00 |
| Example 26 | 58 | 152.4 | 160.0 | 1.05 | 77 | 0.99 |
| Example 27 | 58 | 152.4 | 167.6 | 1.10 | 76 | 0.98 |
| Example 28 | 58 | 152.4 | 228.6 | 1.50 | 76 | 0.91 |
| Example 29 | 58 | 152.4 | 304.8 | 2.00 | 75 | 0.87 |

TABLE 6

| | Length a of 1st partition wall (mm) | Length b of 2nd partition wall (mm) | a/b | Cell density (cells/cm$^2$) | x (mm) | z (mm) |
|---|---|---|---|---|---|---|
| Comparative example 10 | 0.910 | 0.910 | 1.00 | 46 | 0.411 | 0.411 |
| Example 22 | 0.902 | 0.910 | 1.01 | 47 | 0.411 | 0.407 |
| Example 23 | 0.895 | 0.910 | 1.02 | 48 | 0.411 | 0.403 |
| Example 24 | 0.834 | 0.910 | 1.09 | 52 | 0.411 | 0.373 |
| Example 25 | 0.758 | 0.910 | 1.20 | 59 | 0.411 | 0.335 |
| Comparative example 11 | 0.910 | 0.910 | 1.00 | 46 | 0.411 | 0.411 |
| Example 26 | 0.902 | 0.910 | 1.01 | 47 | 0.411 | 0.407 |
| Example 27 | 0.895 | 0.910 | 1.02 | 48 | 0.411 | 0.403 |
| Example 28 | 0.834 | 0.910 | 1.09 | 52 | 0.411 | 0.373 |
| Example 29 | 0.758 | 0.910 | 1.20 | 59 | 0.411 | 0.335 |

(Results)

The honeycomb filters of Examples 1 to 29 exhibited lower pressure losses than those of the reference honeycomb filters. In other words, it has been confirmed that the honeycomb filters configured such that T2/T1 is greater than 1.0 and below 2.5, and the total open frontal area is greater than 35% and equal to or less than 95% can achieve lower pressure losses. The pressure losses of Comparative examples 4 and 7 to 9, in which T2/T1 was equal to or more than 2.5 were higher. Comparative example 9 exhibited a total open frontal area that is 35% and exhibited an extremely high pressure loss.

The honeycomb filter in accordance with the present invention can be used as a filter for purifying exhaust gas.

DESCRIPTION OF REFERENCE NUMERALS 1, 21, 41: partition wall; 1a, 21a, 41a: first partition wall; 1b, 21b, 41b: second partition wall; 2, 22, 42: cell; 2a, 22a, 42a: inflow cell: 2b, 22b, 42b: outflow cell; 3, 23: circumferential wall; 4, 24, 44: honeycomb substrate; 5, 25, 45: plugging portion; 46: thickness inclination section; 11, 31, 51: inflow end face; 12: outflow end face; 100, 200, 300: honeycomb filter; T1: thickness of the first partition wall; and T2: thickness of the second partition wall.

What is claimed is:

1. A honeycomb filter comprising:
a pillar-shaped honeycomb substrate having a porous partition wall provided, surrounding a plurality of cells that extend from an inflow end face to an outflow end face; and
a plugging portion provided at an end portion on either the inflow end face side or the outflow end face side of the cells,
wherein, in a section that is orthogonal to the extending direction of the cells,
the shape of an inflow cell having the plugging portion provided at the end portion on the outflow end face side is hexagonal,
the shape of an outflow cell having the plugging portion provided at the end portion on the inflow end face side is hexagonal,
the plurality of cells have a structure in which a plurality of inflow cells surround the periphery of one outflow cell such that one side of the inflow cell and one side of the outflow cell that is adjacent to the inflow cell are parallel,
the partition wall includes a first partition wall provided between the inflow cell and the outflow cell and a second partition wall provided between the inflow cells,
at least one of the first partition walls is configured such that a value of the ratio of a thickness T2 of the second partition wall with respect to a thickness T1 of the first partition wall (T2/T1) is greater than 1.0 and below 2.5, and
a total open frontal area of the honeycomb substrate is greater than 35% and equal to or less than 95%.

2. The honeycomb filter according to claim 1, wherein the second partition wall has a thickness inclination section in which the thickness T2 of the second partition wall decreases or increases toward a portion of connection with the first partition wall.

3. The honeycomb filter according to claim 1, wherein the thickness T1 of the first partition wall is 70 to 350 μm.

4. The honeycomb filter according to claim 1, wherein the hydraulic diameter of the inflow cell is greater than the hydraulic diameter of the outflow cell.

5. The honeycomb filter according to claim 1, wherein length of one side of the outflow cell is 0.5 to 1.6 mm.

6. The honeycomb filter according to claim 1, wherein the porosity of the partition wall is 35 to 70%.

7. The honeycomb filter according to claim 6, wherein the porosity of the partition wall is 50 to 70%.

8. The honeycomb filter according to claim 1, wherein six of the hexagonal inflow cells surround the periphery of one of the outflow cells in a section that is orthogonal to the extending direction of the cells.

9. The honeycomb filter according to claim 1, wherein the inflow cells have a regular hexagonal shape in a section that is orthogonal to the extending direction of the cells.

10. The honeycomb filter according to claim 1, wherein the inflow cells have a hexagonal shape other than a regular hexagonal shape in a section that is orthogonal to the extending direction of the cells.

11. The honeycomb filter according to claim 10, wherein the inflow cells have a hexagonal shape in which the lengths of at least one set of opposing sides are different in a section that is orthogonal to the extending direction of the cells.

12. The honeycomb filter according to claim 11, wherein the inflow cells have a hexagonal shape in which opposing sides have different lengths in a section that is orthogonal to the extending direction of the cells.

* * * * *